United States Patent
Wycech

(10) Patent No.: US 6,455,144 B1
(45) Date of Patent: *Sep. 24, 2002

(54) OVEN CURED STRUCTURAL FOAM WITH DESIGNED-IN SAG POSITIONING

(75) Inventor: Joseph S. Wycech, Grosse Pointe Shores, MI (US)

(73) Assignee: Henkel Corporation, Gulph Mills, PA (US)

( * ) Notice: Subject to any disclaimer, the term of this patent is extended or adjusted under 35 U.S.C. 154(b) by 85 days.

This patent is subject to a terminal disclaimer.

(21) Appl. No.: 09/580,883

(22) Filed: May 30, 2000

Related U.S. Application Data

(63) Continuation of application No. 09/236,746, filed on Jan. 25, 1999, now Pat. No. 6,092,864.

(51) Int. Cl.[7] .............................. B32B 5/14; B60R 27/00
(52) U.S. Cl. ................... 428/308.4; 428/304.4; 296/204; 296/187; 296/205; 52/731.6; 52/735.1
(58) Field of Search .......................... 428/304.4, 308.4; 296/204, 187, 205; 52/731.6, 735.1

(56) References Cited

U.S. PATENT DOCUMENTS 5,766,719 A   6/1998   Rimkus ....................... 428/71

FOREIGN PATENT DOCUMENTS

FR          2749263       5/1996
WO        WO 9836944     8/1998

OTHER PUBLICATIONS

Product Brochure entitled "NOVACORE Structural Foam", Novamax Technologies, publication date believed to be Sep. 1996.

*Primary Examiner*—Blaine Copenheaver
*Assistant Examiner*—Hai Vo
(74) *Attorney, Agent, or Firm*—Connolly Bove Lodge & Hutz, LLP

(57) ABSTRACT

A laminate for reinforcing a structural member having a plurality of side walls comprises a carrier having at least one inclined support surface. Each support surface has an outer edge disposed toward a respective side wall. A layer of extruded uncured structural foam is on each support surface and terminates inwardly of the outer edge. The foam expands when cured and tumbles down the inclined support surface of the carrier to become bonded to the side wall as well as the carrier. By being spaced from the outer edge of the support surface, the tendency for the foam to wipe against the side wall is minimized as is the tendency for a worker to touch the foam when the worker places the carrier into the structural member.

22 Claims, 1 Drawing Sheet

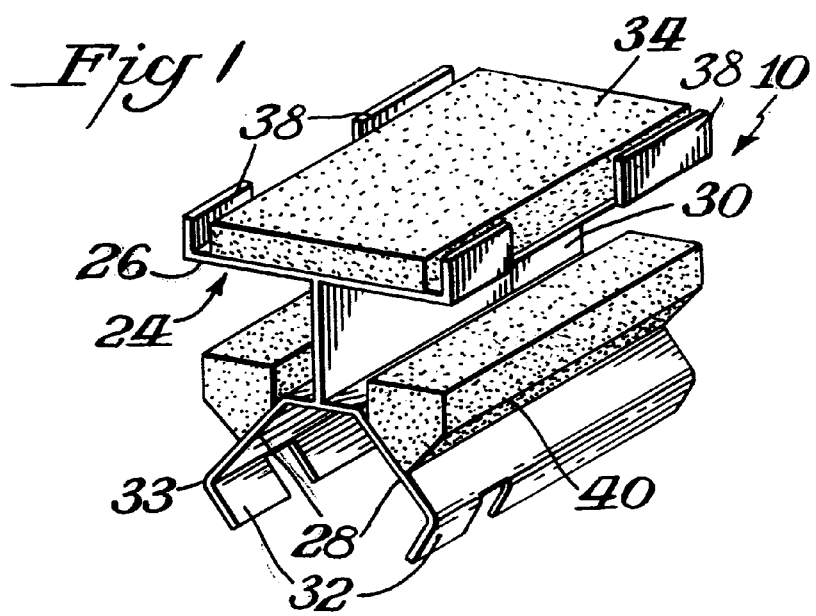
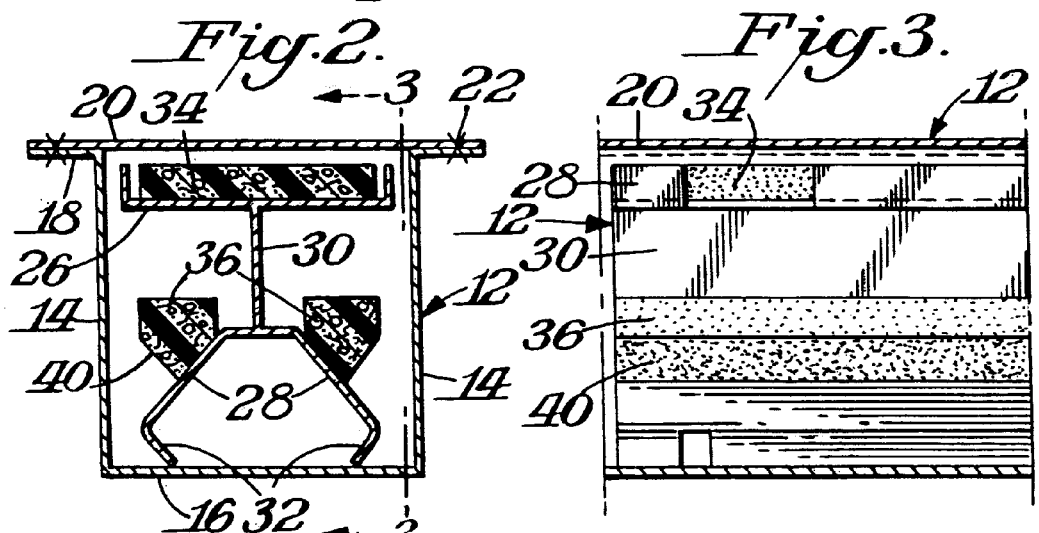
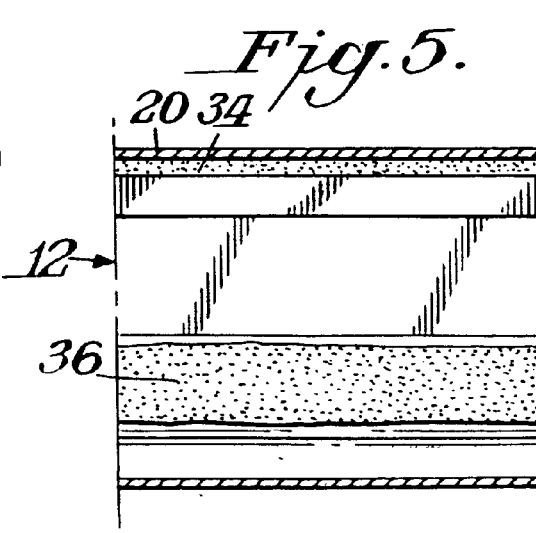

OVEN CURED STRUCTURAL FOAM WITH DESIGNED-IN SAG POSITIONING

CROSS-REFERENCE TO RELATED APPLICATION

This application is a continuation of application Ser. No. 09/236,746, filed Jan. 25, 1999. U.S. Pat. No. 6,092,864.

BACKGROUND OF THE INVENTION

Various applications such as in the automotive field utilize structural foam to reinforce members. One form of application that has been suggested is to place the foam between side walls of a structural member. The placement may be facilitated by having the foam on a carrier which is inserted between the side walls where the foam is a heat expandable foam. The foam is initially bonded to the carrier and upon curing then becomes bonded to the structural member walls. In such approaches the foam is generally spread on the carrier in what would generally correspond to the final location where the foam would be in contact with the walls of the structural member so that upon curing there is assurance that the foam will contact the side walls and become intimately bonded to the side walls. With this technique, however, the foam may wipe against the side walls as it is being placed into the structural member. A further consideration with this technique is that the tacky foam may also contact the worker in, for example, an assembly line where the worker would be placing the foam and its carrier into the structural member.

SUMMARY OF THE INVENTION

An object of this invention is to provide a structural foam design which minimizes the tendency of the foam to wipe against the structural member and to be touched by the worker when the foam is inserted in place.

A further object of this invention is to provide such a structural foam which would be placed on a carrier wherein the foam is shaped and dimensioned in such a manner as to accomplish these objects.

In a preferred practice of this invention the carrier has a plurality of support surfaces onto which a layer of the structural foam would be placed. Each layer of the foam terminates inwardly of the outer edge of the support surface. Thus, when the carrier is inserted into the structural member with the outer edge of each support surface located at the walls of the structural member, the foam is spaced inwardly from the walls of the structural member thus minimizing any tendency for the foam to wipe against the walls while being inserted into the desired location. The carrier also includes sufficient portions free of the foam to function as a handle so that the worker may insert the carrier in place and minimize any tendency to touch the foam.

Preferably, the foam is expandable upon curing so that upon expansion the foam moves into contact with the side walls to be intimately bonded to the carrier and the side walls. In the preferred practice of this invention the foam is thermally expandable. This has the advantage in vehicle assembly lines of utilizing a conventional oven for the assembly line to cure the foam.

In a preferred practice of the invention the foam is extruded in block form and mounted on the support surface of the carrier. The carrier may generally be of I-beam shape having sloping walls which function as a pair of support surfaces. Where the foam is placed on each sloping wall the foam may be undercut to facilitate the foam moving downwardly and outwardly into contact with the structural member wall under the effects of gravity and the soft nature of the oven heated extrusion.

THE DRAWINGS

FIG. 1 is a perspective view of a laminate or drop in insert comprising a carrier and foam in accordance with this invention;

FIG. 2 is a cross sectional elevational view showing the laminate of FIG. 1 mounted in a structural member;

FIG. 3 is a cross-sectional view taken through FIG. 2 along the line 3—3;

FIG. 4 is a view similar to FIG. 2 after the foam has expanded and then cured; and FIG. 5 is a cross-sectional view taken through FIG. 4 along the line 5—5.

DETAILED DESCRIPTION

The present invention is based upon the utilization of a structural foam such as TERACORE® to reinforce structural members. A particular utility of the invention is as a reinforcement for vehicle parts and more particularly where the foam is inserted into a hollow structural member between the walls of the member as part of the assembly line.

In accordance with the invention the structural foam is a polymer which expands upon curing. Preferably, the polymer foam is a heat or thermally expandable foam such as described in U.S. Pat. No. 5,575,526, all of the details of which are incorporated herein by reference thereto. The advantage of a heat expandable foam particularly in connection with a vehicle beam or vehicle part is that the foam would expand when the portion of the vehicle including the structural member or beam would be subjected to heat in an oven such as by the conventional coating processes used in vehicle manufacturing. Thus, a separate heating step is not needed to expand the foam.

While a heat expandable foam is preferred, it is to be understood that the invention may be practiced with other types of foams which are, for example, chemically activated. Thus, any suitable expandable foam material or resin foam may be used in the broad practice of this invention.

FIG. 1 illustrates a drop in insert or laminate 10 particularly designed to reinforce the rail section of a vehicle. Thus, as shown in FIG. 2 the rail section 12 is of generally U-shape with a pair of spaced side walls 14,14 interconnected by a bottom wall 16. Rail section 12 is made of a metal material. The walls 14 have outwardly extending flanges 18 upon which the floor pan 20 is seated to cover the hollow rail section. Floor pan 20 is secured to rail section 12 by known securing structure generally indicated by the reference numeral 22.

Laminate 10 is in the form of a generally I-beam type carrier 24 having a generally horizontal upper support surface 26 and inclined support surfaces 28 connected to upper support surface 26 by web 30. The inclined support surfaces 28 bend at shoulders 33 to terminate in ends or legs 32 which would rest upon bottom or floor 16 of rail section 12.

As best shown in FIGS. 1–2 a block of foam 34 is extruded on upper support surface 26 while blocks of foam 36 are extruded on inclined support surfaces 28.

As also shown in FIGS. 1–2 each layer or block of foam 34,36 terminates inwardly of the outer edge of its respective support surface. Thus, a spacing is shown between the side walls of foam block 34 and the upstanding side walls 38 of upper support surface 26. Similarly, foam blocks 36 terminate at a location spaced from the legs or ends 32 of inclined support surfaces 28. In a preferred practice of this invention each foam block 36 has an undercut 40 for purposes which will be later described.

Because the foam blocks are placed at isolated portions of carrier 24, carrier 24 includes a number of locations free of any foam resin, as is clearly illustrated. These locations may be used by an assembly worker as a handle to drop the laminate or insert 10 into the hollow rail 12 without having the foam wipe against the side walls 14,14 and avoiding or at least minimizing the likelihood that the worker will touch the tacky foam material.

After the laminate 10 is inserted in the rail 12 the rail continues on its assembly line and at a subsequent location the floor pan 20 is mounted to the rail. During a subsequent assembly step the rail is placed in an oven where the one part foam extrusion 34,36 becomes cured and expands outwardly to the condition shown in FIG. 4. As shown therein the upper foam block 34 expands into intimate contact with floor pan 20, thus, not only functioning as a rigid reinforcement, but also bonding the floor pan 20 to the carrier 24 which in turn becomes bonded to the side walls 14 of rail 12 by the expanded foam blocks 36,36.

While in the paint oven the extrusions 34,36 will soften. Extrusions 36,36 will roll outboard or laterally outwardly because of the slope of carrier support surfaces 28 and the undercut 40 of each extrusion 36. In addition, the affects of gravity and the soft nature of the oven heated extrusion 36 help to cause the extrusion 36 to find its final design position where it seats, expands and cures as shown in FIG. 4.

As illustrated in FIGS. 1, 2 and 4 the bend 33 between the sloping surface 28 and the leg 32 is thus disposed generally at a respective side wall 14. When the foam softens and rolls downwardly on the sloping surfaces 28 the distance that bend 33 is spaced from side wall 14 is sufficiently small that the foam bridges the gap to thereby heat, expand and cure into intimate contact with the side wall.

While the invention has been particularly illustrated and described with respect to a vehicle rail section made of metal and a metal carrier, it is to be understood that the invention may be practiced with any type of structural member which is intended to be reinforced by a structural foam. In particular, the invention may be practiced with a structural member which is hollow and thus has spaced walls. The illustrated carrier 24 is shown as having a support surface for each of the spaced walls. It is to be understood, however, that in a broad practice of the invention the carrier may include only one foam extrusion for intimate contact with only one wall or surface of a structural member. Similarly, while the invention may be practiced with various types of structural members, the invention may also be practiced using materials other than metal for the structural member and carrier. Preferably, the materials should be selected so that there is an effective bonding of the expanded foam with the carrier and the structural member. Thus, the carrier and/or the structural member could be made of various plastics or polymeric materials or various wood type fibrous materials having sufficient rigidity for the carrier to function as a support for the polymer layer or foam, and for the structural member to have sufficient rigidity to achieve its intended functions. Where the foam is a heat expandable foam, the carrier should be able to withstand high temperatures. If the foam is chemically cured instead of heat cured then the basic requirement for the carrier is that it has sufficient rigidity to function in its intended manner, but it would not be required to be able to withstand high temperatures. Preferably, the carrier is sufficient shape retaining to assure that it can be properly placed in the structural member with the foam spaced from the walls of the structural member.

It is also to be understood that while the invention has particular utility in the automotive or vehicle fields, the invention may be practiced in other fields where, for example, it is necessary to reinforce a beam and particularly desirable that such reinforcement be accomplished by a structural foam so as to reduce the cost and weight while still achieving the desired rigidity.

The invention thus provides a laminate which makes it possible to locate the tacky foam as a one part extrusion such that the foam does not come into contact with the metal section or walls that it reinforces as the foam is placed in its intended location. Thus, the invention avoids the likelihood that the foam will wipe against the rail or walls of the structural member. An additional advantage is that the worker may manually place the foam as a drop in insert into the structural member while minimizing personal or direct contact with the foam.

What is claimed is:

1. A laminate for reinforcing a structural member comprising a carrier, said carrier having a first support surface, a web extending outwardly and away from said first support surface with said first support surface extending across said web, a second support surface extending outwardly from said web remote from said first support surface, a third support surface extending outwardly from said web remote from said first support surface, said second support surface and said third support surface being on opposite sides of said web and extending away from each other, a layer of uncured structural foam on at least one of said support surfaces, said foam being made of a polymer material which is expandable when being cured for expanding into intimate contact with and bonding to the structural member, and said foam being a block of foam having an undercut to facilitate said foam rolling downwardly and laterally outwardly under the affect of gravity to a location of final seating and expansion and curing.

2. The laminate of claim 1 wherein said foam is heat curable.

3. The laminate of claim 1 in combination with a structural member, said structural member having a plurality of spaced side walls, said carrier being located in said structural member between said side walls, and said foam being expanded into intimate bonding with a respective said side wall upon the curing of said foam.

4. The laminate of claim 3 wherein said structural member is an automotive rail having a bottom wall interconnecting said side walls, said second and third support surfaces being mounted on said bottom wall, and said foam being located on each of said support surfaces.

5. The laminate of claim 1 wherein said foam is on each of said support surfaces.

6. A laminate for reinforcing a structural member comprising a carrier, said carrier having a first support surface, a web extending outwardly and away from said first support surface with said first support surface extending across said web, a second support surface extending outwardly from said web remote from said first support surface, a third support surface extending outwardly from said web remote from said first support surface, said second support surface and said third support surface being on opposite sides of said web and extending away from each other, a layer of uncured structural foam on at least one of said support surfaces, said foam being made of a polymer material which is expandable when being cured for expanding into intimate contact with and bonding to the structural member, each of said second and third support surfaces includes a sloping portion disposed at a non-perpendicular angle to said web, said carrier being generally in the form of an I-beam having an upper wall and a lower wall, said upper wall comprising said first support surface, and said lower wall being bent into said second and third support surfaces.

7. The laminate of claim 6 wherein said foam is a block of foam having an undercut to facilitate said foam rolling downwardly and laterally outwardly under the affect of gravity to a location of final seating and expansion and curing.

8. The laminate of claim 6 wherein an extruded block of said foam is on each of said sloping portions.

9. The laminate of claim 6 wherein said first support surface is an upper support surface, and said foam being on each of said support surfaces.

10. The laminate of claim 9 in combination with a structural member, said structural member having a plurality of spaced side walls, said carrier being located in said structural member between said side walls, and said foam being expanded into intimate bonding with a respective said side wall upon the curing of said foam.

11. The laminate of claim 10 wherein said structural member is an automotive rail having a bottom wall interconnecting said side walls, said second and third support surfaces being mounted on said bottom wall, and said foam being located at each of said side walls.

12. The laminate of claim 11 wherein said carrier is generally in the form of an I-beam having an upper wall and a lower wall, said upper wall comprising said first support surface and said lower wall being bent into said second and third support surfaces.

13. The laminate of claim 12 wherein each of said second and third support surfaces terminates in inwardly bent legs extending from a junction with said sloping portions.

14. The laminate of claim 13 including a floor pan mounted over said rail, and said foam on said upper surface being expanded into intimate contact with said floor pan.

15. The laminate of claim 6 wherein said second and third support surfaces are mirror images of each other.

16. The laminate of claim 6 wherein each of said support surfaces terminates in outwardly extending side flanges.

17. The laminate of claim 6 wherein each of said second and third support surfaces includes a connecting portion extending generally perpendicularly to said web and merging into said sloping portion.

18. The laminate of claim 17 wherein said first support surface is generally perpendicular to said web, and said web is located generally midway of the width of said first support surface.

19. The laminate of claim 18 wherein said foam is on each of said support surfaces.

20. A laminate for reinforcing a structural member comprising a carrier, said carrier including a web extending in a generally vertical direction, a support surface extending outwardly from said web, at least a portion of said support surface being downwardly inclined in a direction away from said web, a layer of uncured structural foam on said inclined portion of said support surface, said foam being made of a polymer material which is expandable when being cured for expanding into intimate contact with and bonding to the structural member, and said foam being a block of foam having an undercut to facilitate said foam rolling downwardly and laterally outwardly under the affect of gravity to a location of final seating and expansion and curing.

21. The laminate of claim 20 including a further support surface extending outwardly from said web, said support surface and said further support surface being on opposite sides of said web and extending away from each other, said further support surface having a downwardly inclined portion, and an undercut block of said foam being on said inclined portion of said further support surface.

22. The laminate of claim 21 wherein said support surface and said further support surface are mirror images of each other.

* * * * *